United States Patent
Grosz et al.

(10) Patent No.: US 11,681,461 B2
(45) Date of Patent: *Jun. 20, 2023

(54) HOST INQUIRY RESPONSE GENERATION IN A MEMORY DEVICE

(71) Applicant: Micron Technology, Inc., Boise, ID (US)

(72) Inventors: Nadav Grosz, Broomfield, CO (US); David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,020

(22) Filed: Nov. 22, 2021

(65) Prior Publication Data

US 2022/0083263 A1    Mar. 17, 2022

Related U.S. Application Data

(63) Continuation of application No. 16/235,168, filed on Dec. 28, 2018, now Pat. No. 11,182,102.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 12/00; G06F 13/00
See application file for complete search history.

(56) References Cited

U.S. PATENT DOCUMENTS

| | | |
|---|---|---|
| 5,574,862 A | 11/1996 | Marianetti, II |
| 5,937,426 A | 8/1999 | Sokolov |
| 6,370,323 B1 | 4/2002 | Adolph et al. |
| 2004/0205092 A1 | 10/2004 | Longo et al. |
| 2009/0228821 A1 | 9/2009 | Tapper |
| 2011/0078336 A1 | 3/2011 | Radke et al. |
| 2013/0254454 A1 | 9/2013 | Ide et al. |
| 2013/0339644 A1 | 12/2013 | Fisher |
| 2014/0089556 A1* | 3/2014 | Ballard ............... G06F 13/385 710/316 |
| 2015/0378841 A1 | 12/2015 | Jayakumar et al. |
| 2016/0011966 A1* | 1/2016 | Keeler ............... G06F 12/0638 711/103 |
| 2017/0006109 A1* | 1/2017 | Yang .................... H04L 45/02 |
| 2017/0351636 A1 | 12/2017 | Chen et al. |
| 2018/0089116 A1 | 3/2018 | Park et al. |
| 2019/0087129 A1 | 3/2019 | You |
| 2020/0210097 A1 | 7/2020 | Grosz et al. |

FOREIGN PATENT DOCUMENTS

CN      111538609 A     8/2020

* cited by examiner

*Primary Examiner* — Tuan V Thai
(74) *Attorney, Agent, or Firm* — Schwegman Lundberg & Woessner, P.A.

(57) ABSTRACT

Devices and techniques for generating a response to a host with a memory device are provided. A first command from a host can be executed. A status for the first command can he determined. An inquiry from the host about a second command can be received after execution of the first command has begun. A response can be made to the inquiry that includes information about the second command and the status for the first command.

22 Claims, 4 Drawing Sheets

HOST INQUIRY RESPONSE GENERATION IN A MEMORY DEVICE

This application is a continuation of U.S. application Ser. No. 16/235,168, filed Dec. 28, 2018, which is incorporated herein by reference in its entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), or magnetoresistive random-access memory (MRAM), among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings, Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A variety of communications protocols can be used to communicate between a host and a memory device. Examples of such protocols can include the Open NAND Flash Interface (ONFi), eMMC, UFS, Serial Peripheral Interface (SPI), among others. These protocols generally enable the host to communicate commands—such as write (e.g., program), read, request the status of a command, request the status of the memory device, start or perform housekeeping operations such as intra-memory transfers, garbage collection, etc.—with the memory device. Generally, these protocols restrict initiation of communication to the host. That is, the host makes a request and the memory device responds. in some examples, the memory device has the ability to issue an exception (e.g., interrupt) that is designed to prompt the host to make a request for the status of the operation subject to the exception.

An issue with traditional memory device communications protocols arises from the general inability of the memory device to instigate a communication. For example, if a write command is taking longer than expected, perhaps causing a performance impact on the memory device, the memory device generally does not have a way to inform the host until the host request the status of the write. It is possible that the memory device could terminate the write command and issue an exception that this occurred, but such an action can lead to other problems, such as inconsistent data, or even further reduced performance if the host would simply reissue the write command again. Simply modifying existing memory device communications protocols to enable the memory device to initiate such as status update for the write command can introduce a host of compatibility problems with existing devices.

To address the issues noted above, the memory device can use a multi-command status response. Here, the memory device responds to a traditional host inquiry about a command with status information about one or more other commands. When the inquiry of the command comes before the host requests the status for the other commands, the mufti-command status response enables the memory device to inform the host of the status for the other commands in a manner approximating a memory device initiated communication without having to change the communication protocol between the host and the memory device. In addition to the increased communication flexibility enabled by mufti-command status responses, overall communications overhead can be reduced because the host need not separately inquire about the statuses of the other commands. These benefits are achieved without breaking existing communications protocols, enabling enhanced memory device performance on existing host and memory devices. Additional details and examples are provided below.

Figure 1:
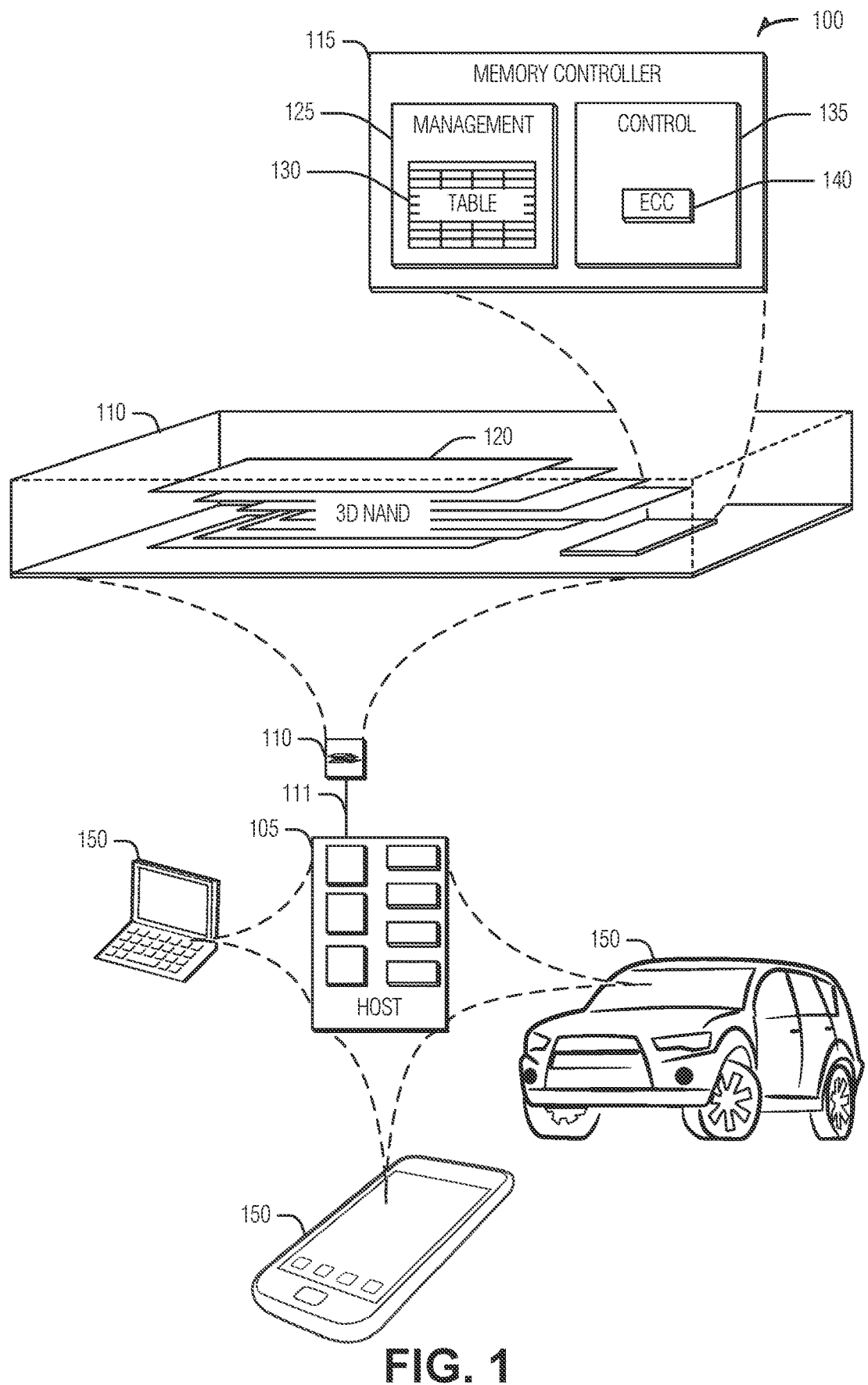
FIG. 1 illustrates an example of an environment including a memory device upon which one or more embodiments may be implemented.

FIG. 1 illustrates an example of an environment 100 including a host 105 and a memory device 110 configured to communicate over a communication interface 111. The host 105 and the memory device 110 may be included in a variety of products 150, such as IoT devices (e.g., a refrigerator or other appliance, sensor, motor or actuator, mobile communication device, automobile, mobile phone, drone, etc.) to support processing, communications, or control of a given one of the products 150.

One or more communication interfaces 111 can be used to transfer data between the memory device 110 and the host 105. Communication interfaces 111 can include a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host 105 can include a host system, an electronic device, a processor, a CPU, a memory card reader, or one or more other electronic devices. In some examples, the host 105 may be a machine having some portion of the components discussed in reference to the machine 300 of FIG. 3.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor).

The memory controller 115 can receive instructions from the host 105 via communication interface 111, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits, lines, or interfaces to transfer data to or from the memory array 120. The memory controller 115 can include a memory manager 125 and an array controller 135.

In the context of multi-command status responses, the memory controller 115 is configured to overload status responses for the communication interface (e.g., ONFI, EMMC, UFS, SPI, etc.). As mentioned above, this not only reduces communication overhead, but can enable the memory controller 115 to communicate the status of a command before that status is queried by the host 105. The examples below contemplate a two command interaction for simplicity, but more commands can be involved in a multi-command status response scenario. To begin, the memory controller 115 is configured to execute a first command from the host 105. The first command can be any command normally accepted by the memory controller 115 from the host 105 to effect the array 120 (e.g., reading, writing, or erasing data or metadata), management of the memory device 100 (e.g., via the memory manager 125 as described below), etc.

After the first command is executing, the memory controller 115 is configured to determine a status for the first command. The status can include standard status result for a host 105 inquiry as to the status of the first command as defined by the interface 111, or the status can include additional information that is outside of the definitions provided by the interface 11. In an example, the status indicates an error that occurred during the execution of the first command. An error can include failure to complete the command (e.g., insufficient storage to write data, an inability to read at an address due to missing or corrupted data, etc.) or failure for the command execution to meet a metric (e.g., power use during the execution of the command). An example of such a failure can include operating beyond a time budget to complete the command. Thus, in an example, the status corresponds to a period of command pendency for the first command. In an example, the period of command pendency is determined based on a host timeout interval (e.g., host defined time budget for the command to complete). These examples generally relate a situation in which execution of the first command falls outside of normal bounds of operation (e.g., a threshold of operation is exceeded).

In an example, the status indicates progress of the first command, In an example, the progress indicates that the first command is complete. In an example, the status indicates a number of elements (e.g., blocks) that remain to be processed to complete the first command. These statuses track the progress of the command and can be used by the host 105 to determine whether there is a problem, or simply to pipeline processes.

The memory controller 115 is configured to receive an inquiry from the host 105 about a second command. An example inquiry is a ready status check of the memory device 110. Here, the host 105 is polling the memory controller 115 to determine when the host 105 can issue the second command. The inquiry can also be a status of the second command. Here, the second command has already been, or is currently being, executed by the memory controller 115 and the inquiry is a standard status check for that second command, In either case, the inquiry, according to the interface 111, entails the memory controller 115 providing a response. It is important to note that there is no requirement that the first command and second command be related to each other in any way. That is, although these two commands can be related (e.g., a first write and a second write for a single file), they need not be.

In an example, the memory controller 115 is configured to generate an exception, interrupt, or other signal in accordance with the interface 111 to provoke the inquiry about the second command. This technique enables the memory controller 115 to have some limited control in initiating a communication to the host 105, Generally, this technique is appropriate where the exception is acceptable for the second command but not for the first (e.g., provoking an exception on the first command would violate the interface 111 or could result in adverse side effects such as data corruption).

In an example, the memory controller 115 is configured to perform the status determination in response to receiving the inquiry. This example is appropriate for progress statuses of the first command, where the status values can change over time. By triggering the status determination upon the inquiry arrival, the most current status of the first command is produced.

The memory controller 115 is configured to provide a response to the inquiry from the host 105 in accordance with the interface 111. This response, however, also includes the status for the first command. In an example, the status for the first command is included only if the host 105 did not inquire as to the status of the first command between the determination that the status changed and the inquiry for the second command. In this case, by including the status of the first command along with the response to the inquiry about the second command, the memory controller 115 effectively initiates communication with the host 105 regarding the status of the first command without any changes to the interface 111.

The effect of the multi-command status response also includes a reduction in communication overhead because the host 105 does not have to send separate requests for the statuses of all executing workloads. Some techniques can be used to further increase this efficiency in overhead. In an example, the first command is not identified in the response. This can be accomplished with a pre-defined technique for determining the first command. For example, the additional status in the response can refer to the command executed previously to the second command. In an example, all executing commands can be cycled through in an order maintained by both the host 105 and the memory controller 115. In an example, a code can be used to identify the commands. For example, each command can be assigned a value in a codebook that is shared between the host 105 and the memory controller 115. In this example, the first command can be identified by the code and dereferenced by the host 105 upon receipt of the multi-command status response.

The actual form and delivery mechanism of the response is dependent upon the interface 111. Thus, in an example, the response is held in a register that the host 105 reads in accordance with a host-controller protocol. This is a common technique for lower-level interfaces. In an example, the response is a message provided to the host 105 (e.g., transmitted to the host 105 rather than read by the host 105 as is the case with the register example) in accordance with the interface 111. Here, the status for the first command is included within the body of the message.

The array controller 135 can include, among other things, circuitry or components configured to control memory operations associated with writing data to, reading data from, or erasing one or more memory cells of the memory device 110. The memory operations can be based on, for example, host commands received from the host 105, or internally generated by the memory manager 125 (e.g., in association with wear leveling, error detection or correction, etc.).

Each flash memory cell in a NOR or NAND architecture semiconductor memory array can be programmed individually or collectively to one or a number of programmed states.

For example, a single-level cell (SLC) can represent one of two programmed states (e.g., 1 or 0), representing one bit of data. However, flash memory cc-311s can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

The memory array 120 can include multiple memory cells arranged for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384÷2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding single-level cell (SLC) NAND flash device. As such, the MLC device may require more metadata bytes for error data than the corresponding SLC device.

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of controller 115, errors occurring in one or more of the NAND arrays, or any one or more of the multi-level cell(s) (MLC) of the memory device 110. The memory controller 115 can he configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. The memory controller 115 may include a command queue (not shown) that tracks memory commands received from a host. Commands in the queue may he executed by controller 115 in a first-in first-out (FIFO) manner, stack manner, out of sequence, according to priority, or in any other suitable order. The command queue includes status information associated with each command in the queue. Such status information may include a BER of the given command, a remaining number of blocks associated with the given command, and a timestamp representing a time interval since the memory device 110 received the given command.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory controller 115). For example, the management tables 130 can include information regarding block age, block erase count, error history, error parameter information, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith, For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding single-level cell (SLC) NAND flash device. As such, the MLC device may require more metadata bytes for error data than the corresponding SLC device.

Figure 2:
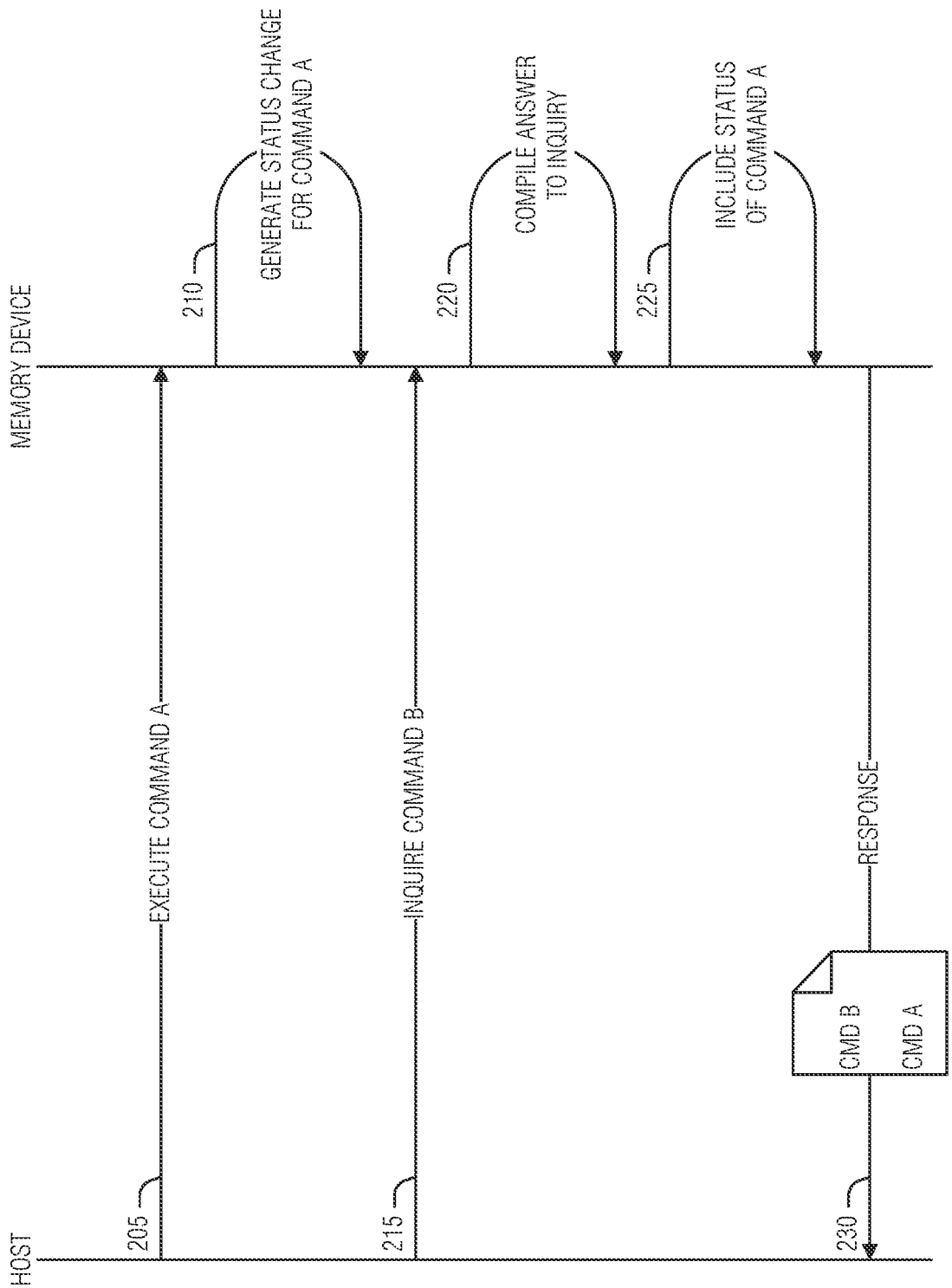
FIG. 2 is swim lane diagram illustrating an example control flow for a mufti-command status response.

FIG. 2 is swim lane diagram illustrating an example control flow for a multi-command status response. Here, the host starts execution of command A with a message 205. The memory device then executes command A. During this execution, the memory device generates a status change for command A (operation 210). As mentioned elsewhere, the status change can include progress (e.g., blocks written, blocks left to write, percent of command complete, etc.), timing (e.g., milliseconds left until command is complete, time budget of the command remaining, milliseconds beyond time budget command has run, etc.), errors, or other metrics of the command execution (e.g., energy expended to complete the command). In an example, the status change is the data that the memory device would provide to the host if the host inquires as to the status of command A.

After execution of command A was initiated with message 205, the host makes an inquiry about command B (message 215). The inquiry can be a status request about command B if it already executing, an inquiry as to whether the memory device is ready, or specifically ready to accept command B, etc. In accordance with traditional operations, the memory device compiles an answer to the inquiry (operation 220).

The memory device also takes the opportunity to provide the status of command A before the host requests a status update of command A. Thus, the memory device gathers the status of command A (operation 225) and includes it in a response to the host (message 230). In this manner, the memory device can communicate the status of command A earlier than it otherwise could all while in total compliance with existing host communications standards.

Figure 3:
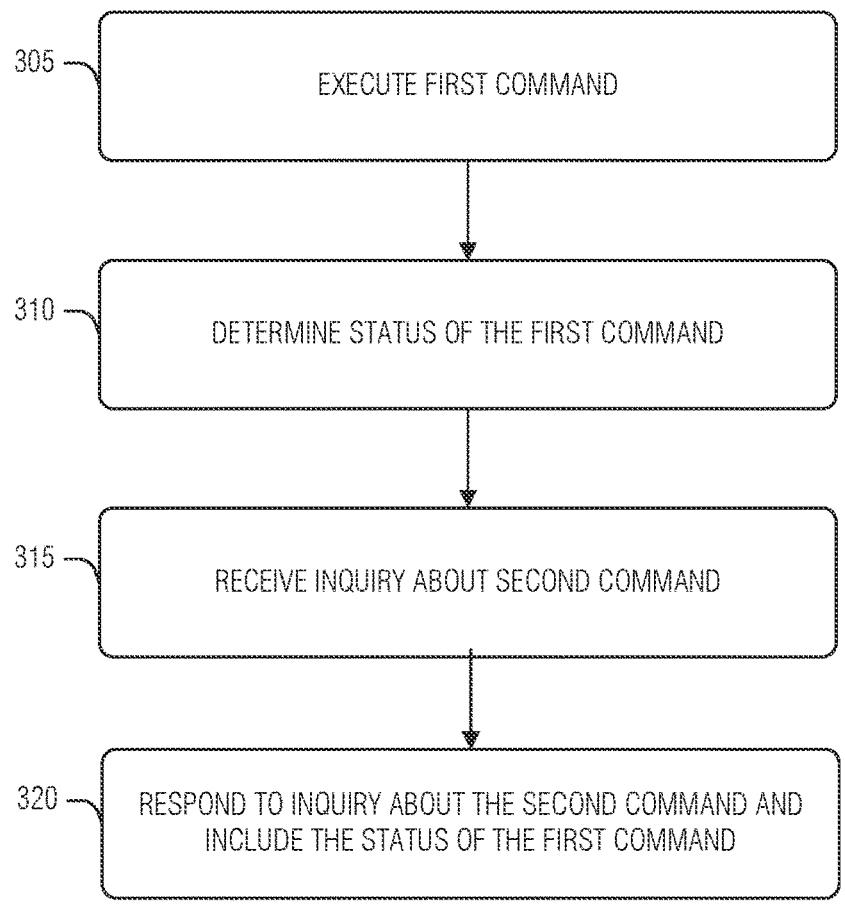
FIG. 3 is a flow chart of an example of a method for multi-command status response.

FIG. 3 is a flow chart of an example of a method 300 for multi-command status response. The operations of the method 300 are implemented in computer hardware, such as that described above (e.g., a memory controller) or below (e.g., processing circuitry).

At operation 305, a first command from a host is executed by a memory device. Examples of the first command can include a write, a read, a maintenance operation (e.g., initiate garbage collection, etc.), among others.

At operation 310, a status for the first command is determined by the memory device. In an example, the status indicates an error that occurred during the execution of the first command. An error can include failure to complete the command (e.g., an inability to write the designated data to a designated block) or failure for the command execution to meet a metric (e.g., power use during the execution of the command). An example of such a failure can include operating beyond a time budget to complete the command. Thus, in an example, the status corresponds to a period of command pendency for the first command. In an example, the period of command pendency is determined based on a host timeout interval (e.g., host defined time budget for the command to complete).

In an example, the status indicates progress of the first command. In an example, the progress indicates that the first command is complete. In an example, the status indicates a number of elements (e.g., blocks) that remain to be processed to complete the first command. These statuses track the progress of the command and can be used by the host to determine whether there is a problem, or simply to pipeline processes (e.g., to ensure that the result is complete before moving on to another command).

At operation 315, an inquiry from the host about a second command is received after execution of the first command has begun. An example enquiry is a ready status check of the memory device by the host to determine whether the memory device can accept the second command. The inquiry could also include a status check on the second command if, for example, it is already executing on the memory device.

In an example, the operations of the method 300 can be extended to include generation of an exception for the second command to cause the host to send the inquiry. Here, the memory device provokes the host to check the status of the second command. This provocation can be in accordance with standard protocol (e.g., the second command failed and an exception is raised in accordance with the communication protocol) or can be deliberate in order to communicate the statuses of both the first command and the second command at operation 320 below. This technique enables the memory device to have some limited control in initiating a communication to the host.

At operation 320, a response to the inquiry is provided to the host from the memory device. Here, the response includes both information about the second command and the status for the first command. By including the status of the first command along with the response to the inquiry about the second command, the memory device can actively provide the status of the first command to the host without waiting for the host to initiate the communication. Such a multi-command status response can relieve the communication overhead between the host and the memory device while still complying with a standard host-to-memory device communications standard.

In an example, the first command is not identified in the response. This can be accomplished with a pre-defined technique for determining the first command. For example, the additional status in the response can refer to the command executed previously to the second command. In an example, all executing commands can be cycled through in an order maintained by both the host and the memory device.

In an example, the response is held in a register that the host reads in accordance with a host-controller protocol. For example, in the ONFI standard, the register 70$h$ is a bi-directional communication register that can be used to store the status. In an example, the response is a message provided to the host (e.g., transmitted to the host rather than read by the host as is the case with the register example) in accordance with a host-controller protocol. Here, the status for the first command is included within the body of the message.

Figure 4:
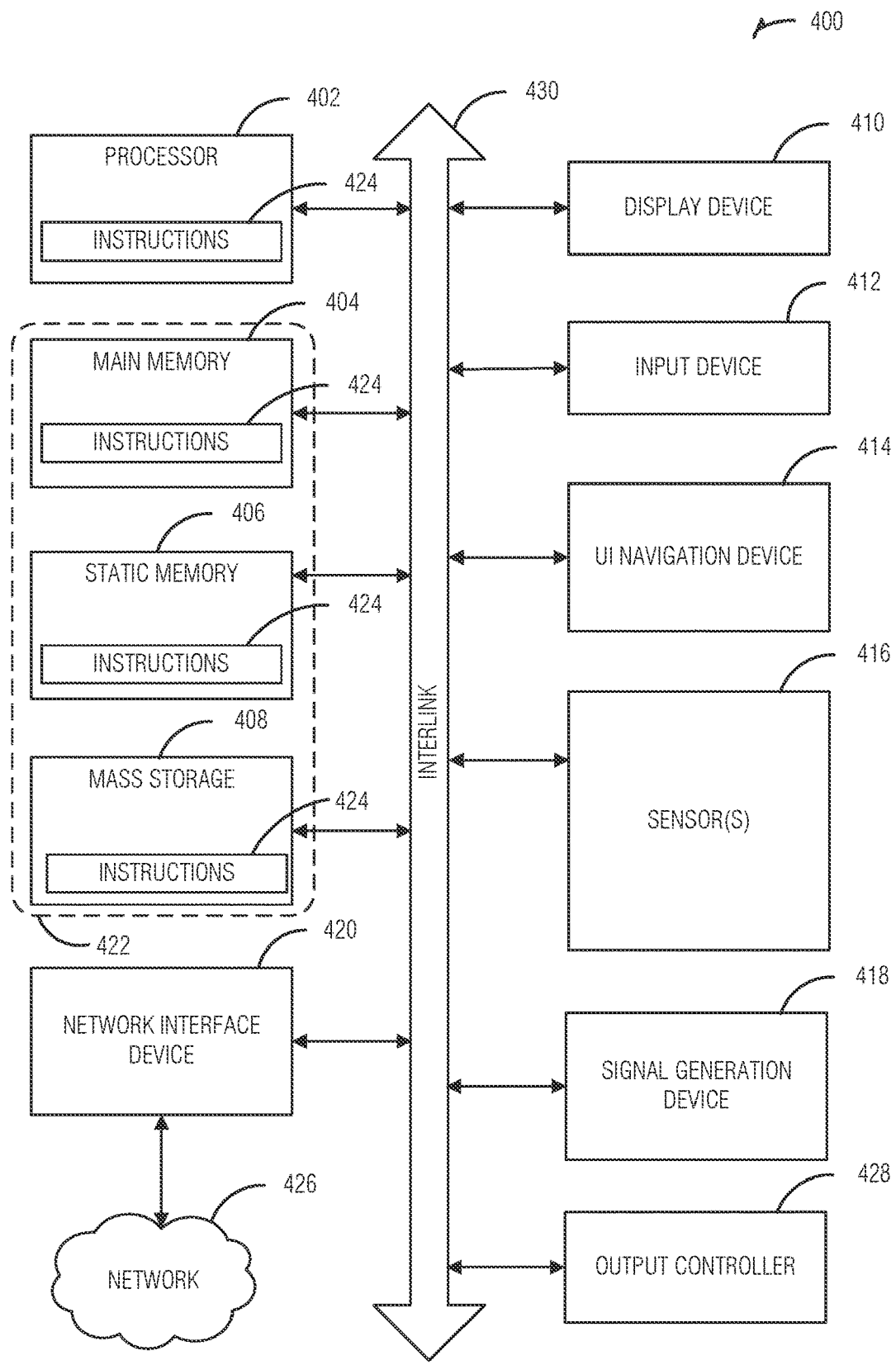
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein can perform, In alternative embodiments, the machine 400 can operate as a standalone device or can be connected (e.g., networked) to other machines. In a networked deployment, the machine 400 can operate in the capacity of a server machine, a client machine, or both in server-client network environments. In an example, the machine 400 can act as a peer machine in peer-to-peer (P2P) (or other distributed) network environment. The machine 400 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 400 (e.g., the host device 105, the memory device 110, etc.) can include a hardware processor 402 (e.g., a central processing unit (CPU), a graphics processing unit (GPU), a hardware processor core, or any combination thereof, such as the memory controller 115, etc.), a main memory 404 and a static memory 406, some or all of which can communicate with each other via an interlink (e.g., bus) 408. The machine 400 can further include a display unit 410, an alphanumeric input device 412 (e.g., a keyboard), and a user interface (UI) navigation device 414 (e.g., a mouse). In an example, the display unit 410, input device 412 and UI navigation device 414 can be a touch screen display. The machine 400 can additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 can include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 408 can include a machine readable medium 422 on which is stored one or more sets of data structures or instructions 424 (e.g., software) embodying or utilized by any one or more of the techniques or functions described herein. The instructions 424 can also reside, completely or at least partially, within the main memory 404, within static memory 406, or within the hardware processor 402 during execution thereof by the machine 400, In an example, one or any combination of the hardware processor 402, the main memory 404, the static memory 406, or the storage device 408 can constitute the machine readable medium 422.

While the machine readable medium 422 is illustrated as a single medium, the term "machine readable medium" can include a single medium or multiple media (e.g., a centralized or distributed database, or associated caches and servers) configured to store the one or more instructions 424.

The term "machine readable medium" can include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 (e.g., software, programs, an operating system (OS), etc.) or other data are stored on the storage device 421, can be accessed by the memory 404 for use by the processor 402. The memory 404 (e.g., DRAM) is typically fast, but volatile, and thus a different type of storage than the storage device 421 (e.g., an SSD), which is suitable for long-term storage, including while in an "off" condition. The instructions 424 or data in use by a user or the machine 400 are typically loaded in the memory 404 for use by the processor 402. When the memory 404 is full, virtual space from the storage device 421 can be allocated to supplement the memory 404; however, because the storage 421 device is typically slower than the memory 404, and write speeds are typically at least twice as slow as read speeds, use of virtual memory can greatly reduce user experience due to storage device latency (in contrast to the memory 404, e.g., DRAM). Further, use of the storage device 421 for virtual memory can greatly reduce the usable lifespan of the storage device 421.

In contrast to virtual memory, virtual memory compression (e.g., the Linux® kernel feature "ZRAM") uses part of the memory as compressed block storage to avoid paging to the storage device 421. Paging takes place in the compressed block until it is necessary to write such data to the storage device 421. Virtual memory compression increases the usable size of memory 404, while reducing wear on the storage device 421.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 424 can further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as those defined by the Third Generation Partnership Project (3GPP) families of standards (e.g., 3G, 4G, 5G, Long Term Evolution (LTE), etc.), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 420 can include one or more physical jacks (e.g., Ethernet, coaxial, or phone jacks) or one or more antennas to connect to the communications network 426. In an example, the network interface device 420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 400, and includes digital or analog communications signals or other intangible medium to facilitate communication of such software.

Additional Examples:

Example 1 is a memory device for a memory device multi-command status response, the memory device comprising: an interface to receive: a first command from a host; and an inquiry from the host about a second command after execution of the first command has begun; and a controller to: execute the first command from the host; determine a status for the first command; and provide a response to the inquiry, the response including information about the second command and the status for the first command.

In Example 2, the subject matter of Example 1, wherein the status indicates progress of the first command.

In Example 3, the subject matter of Example 2, wherein the progress indicates that the first command is complete.

In Example 4, the subject matter of any of Examples 2-3, wherein the status indicates a number of elements that remain to be processed.

In Example 5, the subject matter of Example 4, wherein the elements are blocks.

In Example 6, the subject matter of any of Examples 1-5, wherein the status corresponds to a period of command pendency for the first command.

In Example 7, the subject matter of Example 6, wherein the period of command pendency is determined based on a host timeout interval.

In Example 8, the subject matter of any of Examples 1-7, wherein the status indicates an error that occurred during the execution of the first command.

In Example 9, the subject matter of any of Examples 1-8, wherein the first command is not identified in the response.

In Example 10, the subject matter of any of Examples 1-9, wherein the controller is configured to generate an exception for the second command, the exception arranged to cause the host to send the inquiry.

In Example 11, the subject matter of any of Examples 1-10, wherein the inquiry is a memory device status request to determine whether the memory device is ready to receive the second command, and wherein the information about the second command in the response confirms that the memory device is ready to receive the second command.

In Example 12, the subject matter of any of Examples 1-11, wherein the response is a message provided to the host in accordance with a host-controller protocol, and wherein the status for the first command is included within the body of the message.

In Example 13, the subject matter of any of Examples 1-12, wherein the response is held in a register that the host reads in accordance with a host-controller protocol.

Example 14 is a method for a memory device multi-command status response, the method comprising: executing a first command from a host; determining a status for the first command; receiving an inquiry from the host about a second command after execution of the first command has begun; and providing a response to the inquiry, the response including information about the second command and the status for the first command.

In Example 15, the subject matter of Example 14, wherein the status indicates progress of the first command.

In Example 16, the subject matter of Example 15, wherein the progress indicates that the first command is complete.

In Example 17, the subject matter of any of Examples 15-16, wherein the status indicates a number of elements that remain to be processed.

In Example 18, the subject matter of Example 17, wherein the elements are blocks.

In Example 19, the subject matter of any of Examples 14-18, wherein the status corresponds to a period of command pendency for the first command.

In Example 20, the subject matter of Example 19, wherein the period of command pendency is determined based on a host timeout interval.

In Example 21, the subject matter of any of Examples 14-20, wherein the status indicates an error that occurred during the execution of the first command.

In Example 22, the subject matter of any of Examples 14-21, wherein the first command is not identified in the response.

In Example 23, the subject matter of any of Examples 14-22, comprising generating an exception for the second command, the exception causing the host to send the inquiry.

In Example 24, the subject matter of any of Examples 14-23, wherein the inquiry is a memory device status request to determine whether the memory device is ready to receive the second command, and wherein the information about the second command in the response confirms that the memory device is ready to receive the second command.

In Example 25, the subject matter of any of Examples 14-24, wherein the response is a message provided to the host in accordance with a host-controller protocol, and wherein the status for the first command is included within the body of the message.

In Example 26, the subject matter of any of Examples 14-25, wherein the response is held in a register that the host reads in accordance with a host-controller protocol.

Example 27 is a machine readable medium including instructions for a memory device multi-command status response, the instructions, when executed by processing circuitry, cause the processing circuitry to perform operations comprising: executing a first command from a host; determining a status for the first command; receiving an inquiry from the host about a second command after execution of the first command has begun; and providing a response to the inquiry, the response including information about the second command and the status for the first command.

In Example 28, the subject matter of Example 27, wherein the status indicates progress of the first command.

In Example 29, the subject matter of Example 28, wherein the progress indicates that the first command is complete.

In Example 30, the subject matter of any of Examples 28-29, wherein the status indicates a number of elements that remain to be processed.

In Example 31, the subject matter of Example 30, wherein the elements are blocks.

In Example 32, the subject matter of any of Examples 27-31, wherein the status corresponds to a period of command pendency for the first command.

In Example 33, the subject matter of Example 32, wherein the period of command pendency is determined based on a host timeout interval.

In Example 34, the subject matter of any of Examples 27-33, wherein the status indicates an error that occurred during the execution of the first command.

In Example 35, the subject matter of any of Examples 27-34, wherein the first command is not identified in the response.

In Example 36, the subject matter of any of Examples 27-35, wherein the operations comprise generating an exception for the second command, the exception causing the host to send the inquiry.

In Example 37, the subject matter of any of Examples 27-36, wherein the inquiry is a memory device status request to determine whether the memory device is ready to receive the second command, and wherein the information about the second command in the response confirms that the memory device is ready to receive the second command.

In Example 38, the subject matter of any of Examples 27-37, wherein the response is a message provided to the host in accordance with a host-controller protocol, and wherein the status for the first command is included within the body of the message.

In Example 39, the subject matter of any of Examples 27-38, wherein the response is held in a register that the host reads in accordance with a host-controller protocol.

Example 40 is a system for a memory device multi-command status response, the system comprising: means for executing a first command from a host; means for determining a status for the first command; means for receiving an inquiry from the host about a second command after execution of the first command has begun; and means for providing a response to the inquiry, the response including information about the second command and the status for the first command.

In Example 41, the subject matter of Example 40, wherein the status indicates progress of the first command.

In Example 42, the subject matter of Example 41, wherein the progress indicates that the first command is complete, In Example 43, the subject matter of any of Examples 41-42, wherein the status indicates a number of elements that remain to be processed.

In Example 44, the subject matter of Example 43, wherein the elements are blocks.

In Example 45, the subject matter of any of Examples 40-44, wherein the status corresponds to a period of command pendency for the first command.

In Example 46, the subject matter of Example 45, wherein the period of command pendency is determined based on a host timeout interval.

In Example 47, the subject matter of any of Examples 40-46, wherein the status indicates an error that occurred during the execution of the first command.

In Example 48, the subject matter of any of Examples 40-47, wherein the first command is not identified in the response.

In Example 49, the subject matter of any of Examples 40-48, comprising means for generating an exception for the second command, the exception causing the host to send the inquiry.

In Example 50, the subject matter of any of Examples 40-49, wherein the inquiry is a memory device status request to determine whether the memory device is ready to receive the second command, and wherein the information about the second command in the response confirms that the memory device is ready to receive the second command.

In Example 51, the subject matter of any of Examples 40-50, wherein the response is a message provided to the host in accordance with a host-controller protocol, and wherein the status for the first command is included within the body of the message.

In Example 52, the subject matter of any of Examples 40-51, wherein the response is held in a register that the host reads in accordance with a host-controller protocol.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A controller for a memory device, the controller comprising:
a first interface to communicate with a host;
a second interface to communicate with the memory device; and
processing circuitry to:
execute a first command received from a host via the first interface on the memory device via the second interface;

receive a status check, via the first interface, from the host for a second command, the status check received after execution of the first command has begun; and provide, via the first interface, a response to the status check that includes both information about the second command and a status for the first command to initiate communication to the host regarding the first command without a host status check for the first command, wherein the response is:

a message provided to the host in accordance with a host-controller protocol, and wherein the status for the first command is included within the body of the message; or held in a register of the first interface that the host reads in accordance with a host-controller protocol with the controller.

2. The controller of claim 1, wherein the status for the first command corresponds to a period of command pendency for the first command.

3. The controller of claim 2, wherein the period of command pendency is determined based on a host timeout interval.

4. The controller of claim 1, wherein the status for the first command indicates an error that occurred during the execution of the first command.

5. The controller of claim 1, wherein the status for the first command indicates progress of the first command.

6. The controller of claim 5, wherein the progress indicates that the first command is complete.

7. The controller of claim 5, wherein the status for the first command indicates a number of elements of the memory device that remain to be processed.

8. The controller of claim 7, wherein the elements are blocks.

9. The controller of claim 1, wherein the first command is not identified in the response.

10. The controller of claim 1, wherein the processing circuitry is configured to generate an exception for the second command, the exception configured to cause the host to send the status check.

11. The controller of claim 1, wherein the status check is a memory device status request to determine whether the memory device is ready to receive the second command, and wherein the information about the second command in the response confirms that the memory device is ready to receive the second command.

12. A non-transitory machine readable medium including instructions that, when executed by processing circuitry of a controller, cause the processing circuitry to perform operations comprising:

executing a first command from a host;

receiving a status check from the host for a second command, the status check received after execution of the first command has begun; and providing a response to the status check that includes both information about the second command and a status for the first command to initiate communication to the host regarding the first command without a host status check for the first command, wherein the response is:

a message provided to the host in accordance with a host-controller protocol, and wherein the status for the first command is included within the body of the message; or held in a register of the first interface that the host reads in accordance with a host-controller protocol with the controller.

13. The non-transitory machine readable medium of claim 12, wherein the status for the first command corresponds to a period of command pendency for the first command.

14. The non-transitory machine readable medium of claim 13, wherein the period of command pendency is determined based on a host timeout interval.

15. The non-transitory machine readable medium of claim 12, wherein the status for the first command indicates an error that occurred during the execution of the first command.

16. The non-transitory machine readable medium of claim 12, wherein the status for the first command indicates progress of the first command.

17. The non-transitory machine readable medium of claim 16, wherein the progress indicates that the first command is complete.

18. The non-transitory machine readable medium of claim 16, wherein the status for the first command indicates a number of elements that remain to be processed.

19. The non-transitory machine readable medium of claim 18, wherein the elements are blocks.

20. The non-transitory machine readable medium of claim 12, wherein the first command is not identified in the response.

21. The non-transitory machine readable medium of claim 12, wherein the operations comprise generating an exception for the second command, the exception causing the host to send the status check.

22. The non-transitory machine readable medium of claim 12, wherein the processing circuitry is included in a controller of a memory device, wherein the status check is a memory device status request to determine whether the memory device is ready to receive the second command, and wherein the information about the second command in the response confirms that the memory device is ready to receive the second command.

* * * * *